(12) United States Patent
Kubo

(10) Patent No.: US 10,942,069 B2
(45) Date of Patent: Mar. 9, 2021

(54) TEMPERATURE MEASUREMENT APPARATUS

(71) Applicant: Mitsubishi Electric Corporation, Tokyo (JP)

(72) Inventor: Akira Kubo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 301 days.

(21) Appl. No.: 15/889,899

(22) Filed: Feb. 6, 2018

(65) Prior Publication Data

US 2019/0128746 A1 May 2, 2019

(30) Foreign Application Priority Data

Oct. 31, 2017 (JP) .............................. JP2017-210031

(51) Int. Cl.
*G01K 7/00* (2006.01)
*G01K 7/02* (2021.01)
*G01K 7/13* (2006.01)

(52) U.S. Cl.
CPC ............... *G01K 7/021* (2013.01); *G01K 7/13* (2013.01)

(58) Field of Classification Search
CPC combination set(s) only.
See application file for complete search history.

(56) References Cited

U.S. PATENT DOCUMENTS

| 6,950,050 B1 * | 9/2005 | Jordan | H03M 1/661 341/131 |
| 8,182,139 B2 * | 5/2012 | Fiennes | G01K 15/00 374/1 |

(Continued)

FOREIGN PATENT DOCUMENTS

| JP | H05-288611 A | 11/1993 |
| JP | 2001-272249 A | 10/2001 |

(Continued)

OTHER PUBLICATIONS

Office Action (Notice of Reasons for Refusal) dated Nov. 24, 2020, by the Japanese Patent Office in corresponding Japanese Patent Application No. 2017-210031 and English translation of the Office Action. (8 pages).

*Primary Examiner* — Lisa M Caputo
*Assistant Examiner* — Nasir U. Ahmed
(74) *Attorney, Agent, or Firm* — Buchanan Ingersoll & Rooney PC

(57) ABSTRACT

There is provided a temperature measurement apparatus that differentiates temperature-measurement resolutions and temperature-calculation accuracies in accordance with the difference of the temperature-measurement range so as to make it possible to universalize temperature-calculation processing among two or more models having different temperature-measurement ranges. In a temperature measurement apparatus, for respective identifiers indicating models of an A/D conversion circuit, a temperature calculation circuit stores corresponding polynomials whose powers and the coefficients of the powers are different from one another, and calculates a temperature by use of the polynomial having the powers and the coefficients of the powers corresponding to the identifier for the A/D conversion circuit that is actually provided.

2 Claims, 3 Drawing Sheets

(56) References Cited

U.S. PATENT DOCUMENTS

| | | | |
|---|---|---|---|
| 2005/0234666 A1* | 10/2005 | Taylor | H04B 17/103 702/66 |
| 2011/0243188 A1* | 10/2011 | Aberra | G01K 7/12 374/171 |
| 2012/0004880 A1* | 1/2012 | Hsu | G01K 1/028 702/99 |
| 2013/0226487 A1* | 8/2013 | Yang | G09G 3/2096 702/64 |
| 2015/0003637 A1* | 1/2015 | Chen | H03G 1/02 381/122 |

FOREIGN PATENT DOCUMENTS

| | | |
|---|---|---|
| JP | 2006-258757 A | 9/2006 |
| JP | 2008-249582 A | 10/2008 |

* cited by examiner

TEMPERATURE MEASUREMENT APPARATUS

INCORPORATION BY REFERENCE

The disclosure of Japanese Patent Application No. 2017-210031 filed on Oct. 31, 2017 including its specification, claims and drawings, is incorporated herein by reference in its entirety.

BACKGROUND

The present disclosure relates to a temperature measurement apparatus that calculates a temperature by use of a polynomial whose variable is thermoelectromotive force of a thermocouple.

With regard to such a temperature measurement apparatus as described above, a technology disclosed in JP-A-2001-272249 is known. In the technology disclosed in JP-A-2001-272249, from thermoelectromotive-force values at a time when two or more different temperatures are measured, the respective coefficients of the powers of a polynomial are determined; then, a temperature is calculated by use of the determined polynomial.

SUMMARY

A desired temperature range differs depending on the measurement subject of the temperature. It is desirable that even in the case where A/D converters of one and the same conversion resolution are utilized, the temperature-measurement resolutions are changed in accordance with the temperature-measurement range. For example, it is desirable that in the case where the temperature-measurement range is narrow, the amplification factor for the thermoelectromotive force of a thermocouple is increased so that in the narrow temperature-measurement range, the temperature is measured with a high measurement resolution. In contrast, it is desirable that in the case where the temperature-measurement range is wide, the amplification factor for the thermoelectromotive force of a thermocouple is decreased so that in order to cover the wide temperature-measurement range, the temperature is measured with a low measurement resolution.

It is desirable that in the case where the temperature-measurement range is wide, the power of a polynomial is raised in order to accurately calculate the temperature in the wide temperature-measurement range; in the case where the temperature-measurement range is narrow, the temperature calculation accuracy can be secured even when the power of the polynomial is lowered.

Thus, it is desirable that in a temperature measurement apparatus, the power of a polynomial and the model of an A/D converter having a different amplification factor and the like are made to differ in accordance with the difference of the temperature-measurement range. However, if software for calculating a temperature is individually designed among two or more models having different temperature-measurement ranges, the costs of designing and production increase.

Thus, there is desired a temperature measurement apparatus that makes it possible that the power of a polynomial and the model of an A/D converter having a different amplification factor and the like are made to differ in accordance with the difference of the temperature-measurement range, and that can universalize software for calculating a temperature among two or more models having different temperature-measurement ranges.

A temperature measurement apparatus according to the present disclosure includes an A/D conversion circuit that amplifies inputted thermoelectromotive force of a thermocouple and then A/D-converts the thermoelectromotive force and a temperature calculation circuit that calculates a temperature by use of a temperature-calculation polynomial whose variable is thermoelectromotive force of the thermocouple, based on actual thermoelectromotive force, of the thermocouple, that is A/D-converted by the A/D conversion circuit; for respective identifiers indicating models of the A/D conversion circuit, the temperature calculation circuit stores corresponding polynomials whose powers and the coefficients of the powers are different from one another; and calculates the temperature by use of the polynomial having the powers and the coefficients of the powers corresponding to the identifier for the A/D conversion circuit that is actually provided.

Because for respective models of the A/D converter, the temperature measurement apparatus according to the present disclosure differentiates powers and the coefficients of the powers of polynomials, it is made possible to differentiate the models of the A/D converters having different amplification factors and the like and the powers of the polynomials, in accordance with the difference of the temperature-measurement range. For respective identifiers for A/D conversion circuits, the corresponding polynomials whose powers and the coefficients of the powers are different from one another are stored, and the temperature is calculated by use of the polynomial having the powers and the coefficients of the powers corresponding to an actual identifier; thus, it is made possible to universalize the software for calculating the temperature by use of a polynomial, among two or more models having different temperature-measurement ranges. Accordingly, it is not required that the software for calculating a temperature by use of a polynomial is individually designed among two or more models having different temperature-measurement ranges; thus, the costs of designing and production can be suppressed.

DETAILED DESCRIPTION OF THE EMBODIMENTS

Embodiment 1

Figure 1:
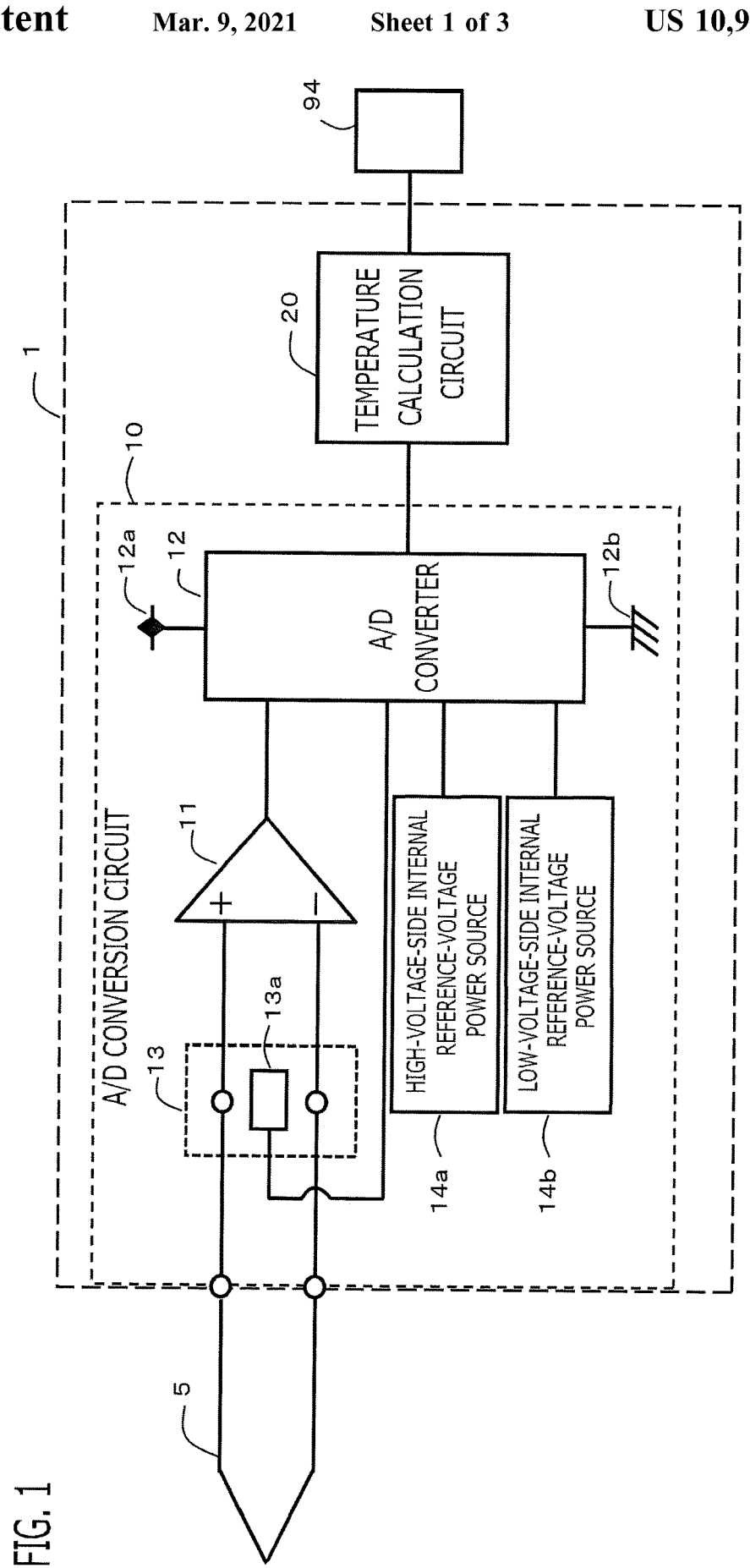
FIG. 1 is a schematic circuit configuration diagram of a temperature measurement apparatus according to Embodiment 1 of the present disclosure.

A temperature measurement apparatus according to Embodiment 1 will be explained with reference to drawings. FIG. 1 is a diagram representing the schematic circuit configuration of a temperature measurement apparatus 1.

The temperature measurement apparatus 1 is provided with an A/D conversion circuit 10 that amplifies and then A/D-converts inputted thermoelectromotive force of a thermocouple 5 and a temperature calculation circuit 20 that calculates a temperature based on an A/D conversion value, by use of a polynomial whose variable is the thermoelectromotive force of the thermocouple 5.

A desired temperature range differs depending on the measurement subject of the temperature. It is desirable that even in the case where A/D converters of one and the same conversion resolution are utilized, the temperature-measurement resolutions are changed in accordance with the temperature-measurement range. For example, it is desirable that in the case where the temperature-measurement range is narrow, the amplification factor for the thermoelectromotive force of the thermocouple 5 is increased so that in the narrow temperature-measurement range, the temperature is measured with a high measurement resolution. In contrast, it is desirable that in the case where the temperature-measurement range is wide, the amplification factor for the thermoelectromotive force of the thermocouple 5 is decreased so that in order to cover the wide temperature-measurement range, the temperature is measured with a low measurement resolution.

In the models of the temperature measurement apparatus 1, the respective temperature-measurement ranges of the temperature measurement apparatuses 1 and the respective amplification factors of the A/D conversion circuits 10 differ from one another. It is desirable that in the case where the temperature-measurement range is wide, the power of a polynomial is raised in order to accurately calculate the temperature in the wide temperature range; in the case where the temperature-measurement range is narrow, the temperature calculation accuracy can be secured even when the power of the polynomial is lowered.

Thus, it is desirable that in the temperature measurement apparatus 1, the power of a polynomial and the amplification factor of the A/D conversion circuit 10 are made to differ in accordance with the difference of the temperature-measurement range. However, if software for calculating a temperature by use of a polynomial is individually designed among two or more models having different temperature-measurement ranges, the costs of designing and production increase. Accordingly, it is desirable to universalize the software for calculating a temperature by use of a polynomial, among two or more models having different temperature-measurement ranges. Hereinafter, respective circuits according to Embodiment 1 will be explained in detail.

<A/D Conversion Circuit 10>

The A/D conversion circuit 10 has an amplifier 11 and an A/D converter 12. The positive terminal and the negative terminal of the thermocouple 5 are connected with the positive input terminal and the negative input terminal, respectively, of the amplifier 11. The output terminal of the amplifier 11 is connected with an input terminal of the A/D converter 12. With a preliminarily set amplification factor, the amplifier 11 amplifies a differential voltage generated in the thermocouple 5, and then outputs the amplified differential voltage. The amplification factor of the amplifier 11 differs depending on the model of the A/D conversion circuit 10.

In Embodiment 1, the amplifier 11 is a differential amplification circuit including an operational amplifier and a resistor. The amplification factor of the amplifier 11 is preliminarily set by setting the value of the resistor. Depending on the model of the A/D conversion circuit 10, the setting of the resistor value differs and hence the amplification factor differs.

In Embodiment 1, the type of the thermocouple 5 to which the temperature measurement apparatus 1 corresponds is the K type whose positive-side metal is chromel and whose negative-side metal is alumel. In the case where the A/D conversion circuit 10 is Model A in which the temperature-measurement range of the temperature measurement apparatus 1 is from 0° C. to 1300° C., the amplification factor of the amplifier 11 is preliminarily set to 240.4%; in the case where the A/D conversion circuit 10 is Model B in which the temperature-measurement range of the temperature measurement apparatus 1 is from 0° C. to 400° C., the amplification factor of the amplifier 11 is preliminarily set to 764.7%. The temperature measurement apparatus 1 may correspond to a thermocouple whose type is other than the K type.

The A/D converter 12 converts the output voltage of the amplifier 11, which is inputted thereto, into a digital signal, and then transmits the digital signal to the temperature calculation circuit 20. The A/D converter 12 converts an input voltage in a preliminarily set input voltage range into a digital signal having a preliminarily set bit number (resolution). In Embodiment 1, the input voltage range is from −10.24 V to +10.24 V, and the number of bits (resolution) is 16. The A/D converter 12 performs A/D conversion at a trigger timing transmitted from the temperature calculation circuit 20. A power-source voltage 12a for activating the A/D converter 12 is supplied to the A/D converter 12; the A/D converter 12 is connected with a ground 12b. The power-source voltage 12a is the reference voltage of the A/D conversion; a fluctuation of the power-source voltage 12a deteriorates the accuracy of the A/D conversion.

In Embodiment 1, the A/D conversion circuit 10 is provided with a cold-contact compensator 13. The cold-contact compensator 13 is provided in order to compensate a fluctuation of thermoelectromotive force, caused by a temperature change in the reference contact (cold contact). The cold-contact compensator 13 is provided with a reference contact temperature sensor 13a for measuring the temperature of the reference contact. The output voltage of the reference contact temperature sensor 13a is inputted to the A/D converter 12. As is the case with the output voltage of the amplifier 11, the A/D converter 12 AD-converts the output voltage of the reference contact temperature sensor 13a and then transmits the digital signal to the temperature calculation circuit 20.

The A/D conversion circuit 10 is provided with internal reference-voltage power sources. The internal reference-voltage power source is utilized in order to compensate deterioration of the accuracy of the A/D conversion, caused by a fluctuation of the power-source voltage 12a and the like. The internal reference-voltage power source outputs a predetermined constant internal reference voltage, regardless of the temperature and the like. The internal reference voltage of the internal reference-voltage power source is inputted to the A/D converter 12. As is the case with the output voltage of the amplifier 11, the A/D converter 12 AD-converts the internal reference voltage of the internal reference-voltage power source and then transmits the digital signal to the temperature calculation circuit 20. In Embodiment 1, there are provided a high-voltage-side internal reference-voltage power source 14a that outputs a high-voltage-side internal reference voltage and a low-voltage-side internal reference-voltage power source 14b that outputs a low-voltage-side internal reference voltage; the A/D converter 12 AD-converts the high-voltage-side internal reference voltage and the low-voltage-side internal reference voltage. The low-voltage-side internal reference-voltage power source 14b may be replaced by the ground. By use of a multiplexer, the A/D converter 12 selects an input voltage to be A/D-converted from two or more input voltages.

<Temperature Calculation Circuit 20>

Based on actual thermoelectromotive force of the thermocouple, which is A/D-converted by the A/D conversion circuit 10, the temperature calculation circuit 20 calculates a temperature by use of a temperature-calculation polynomial whose variable is the thermoelectromotive force of the thermocouple.

Figure 2:
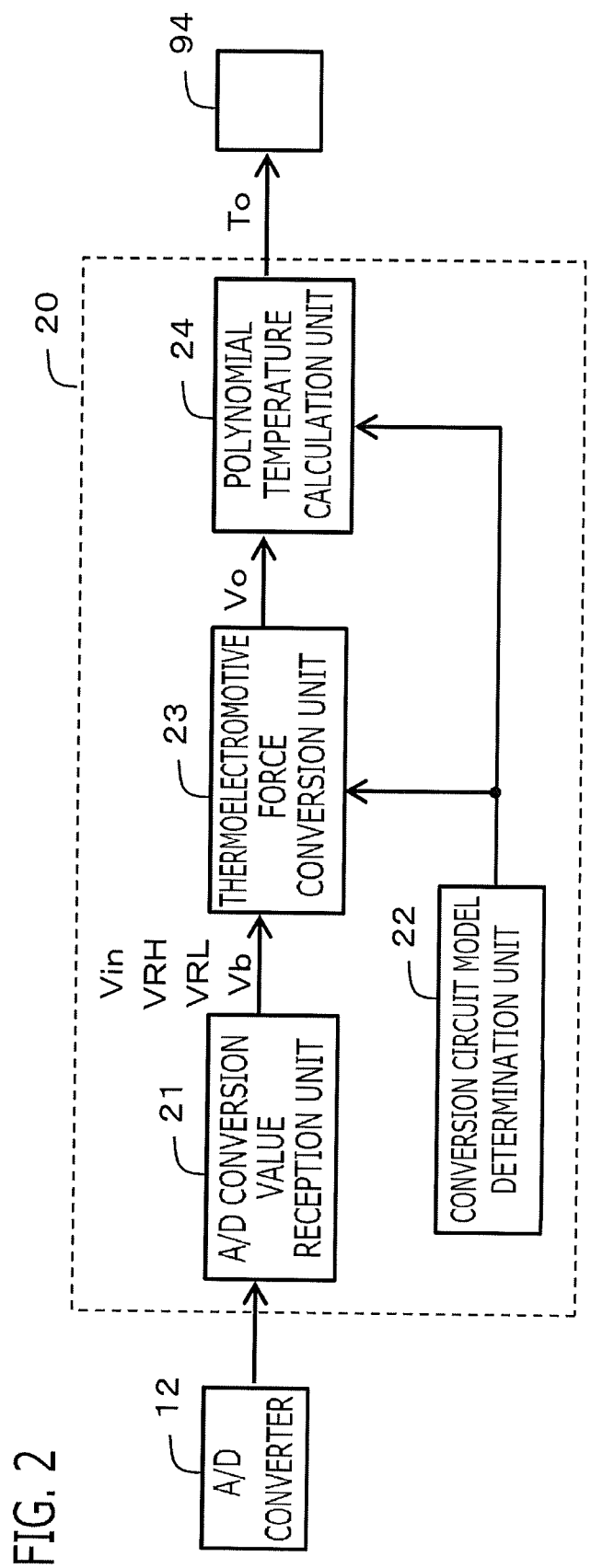
FIG. 2 is a block diagram of a temperature calculation circuit according to Embodiment 1 of the present disclosure.
Figure 3:
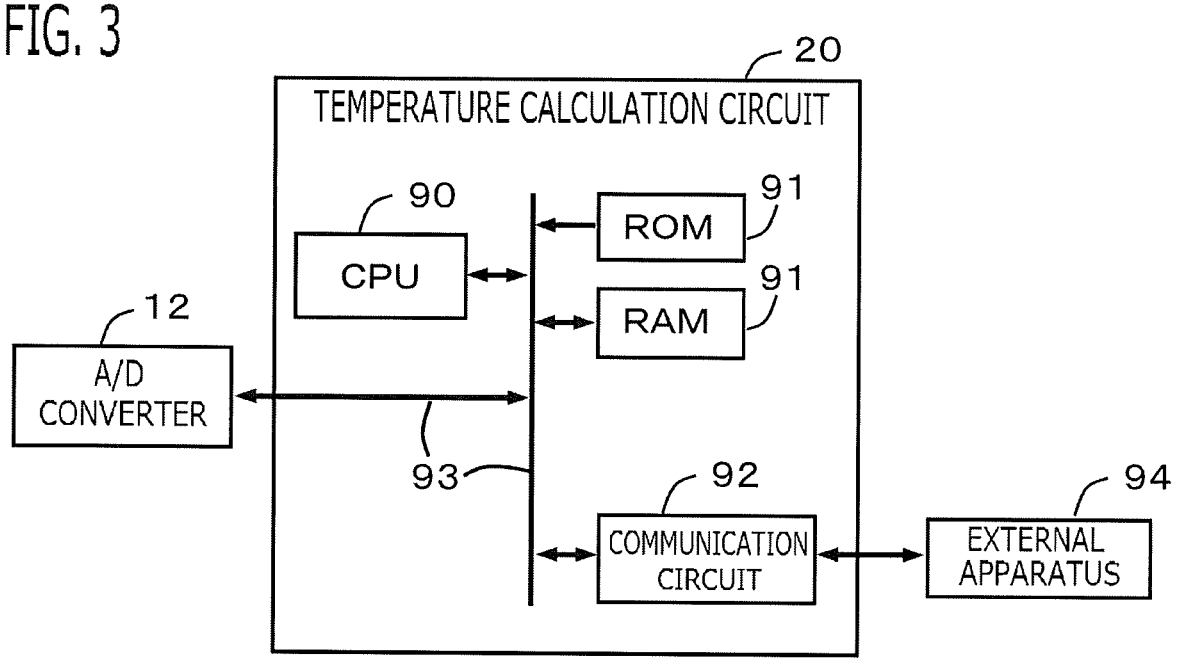
FIG. 3 is a hardware configuration diagram of the temperature calculation circuit according to Embodiment 1 of the present disclosure.

As represented in the block diagram in FIG. 2, the temperature calculation circuit 20 includes processing units such as an A/D conversion value reception unit 21, a conversion circuit model determination unit 22, a thermoelectromotive force conversion unit 23, and a polynomial temperature calculation unit 24. The respective processing units 21 through 24 and the like of the temperature calculation circuit 20 are realized by processing circuits included in the temperature calculation circuit 20. Specifically, as represented in FIG. 3, the temperature calculation circuit 20 includes, as the processing circuits, a calculation processor (computer) 90, storage devices 91 that exchange data with the calculation processor 90, a communication circuit 92 for data communication between the calculation processor 90 and an external apparatus 94, and the like. The calculation processor 90, the storage devices 91, and the communication circuit 92 are connected with one another through a bus 93.

In Embodiment 1, as the calculation processor 90, a CPU (Central Processing Unit) is provided. As the storage devices 91, a RAM (Random Access Memory), a ROM (Read Only Memory), and the like are provided. The calculation processor 90 and the A/D converter 12 are connected with each other through the bus 93. Through the bus 93, the calculation processor 90 transmits to the A/D converter 12 the trigger timing for making the A/D converter 12 perform A/D conversion, a switching command signal for the multiplexer, and the like. The A/D converter 12 transmits an A/D conversion value to the calculation processor 90 through the bus 93. The communication circuit 92 and the external apparatus 94 perform data communication with each other through serial communication.

The calculation processor 90 runs software items (programs) stored in the storage device 91 such as a ROM and collaborates with other hardware devices in the temperature measurement apparatus 1, such as the storage apparatuses 91, the communication circuit 92, and the A/D converter 12, so that the respective processing items are implemented. Setting data pieces to be utilized in the temperature calculation processing, such as the respective polynomials (powers and the respective coefficients of the powers) for the models, the identifier for the A/D conversion circuit 10, the respective amplification factors of the models, and the specification value of the internal reference voltage, are stored, as part of the software items (programs), in the storage device 91 such as a ROM. Processing data pieces such as an A/D conversion value and the like are stored in the storage device 91 such as a RAM.

<A/D Conversion Value Reception Unit 21>

The A/D conversion value reception unit 21 transmits a trigger timing to the A/D converter 12 and receives from the A/D converter 12 the A/D conversion value Vin of the amplification voltage (the output voltage of the amplifier 11) of the thermoelectromotive force of the thermocouple 5. In Embodiment 1, in order to A/D-convert the amplification voltage of the thermoelectromotive force of the thermocouple 5, the output voltage of the reference contact temperature sensor 13a, and the respective output voltages of the internal reference-voltage power sources 14a and 14b, the A/D conversion value reception unit 21 transmits the multiplexer switching signal and the trigger timing to the A/D converter 12 and receives the respective A/D conversion values of the foregoing voltages from the A/D converter 12. The A/D conversion processing and the temperature calculation processing are performed periodically.

<Conversion Circuit Model Determination Unit 22>

The conversion circuit model determination unit 22 determines the model of the A/D conversion circuit 10. In Embodiment 1, information on an identifier indicating the model of the A/D conversion circuit 10 is preliminarily stored in the storage device 91 such as a ROM; the conversion circuit model determination unit 22 reads out the information on the identifier from the storage device 91 and then determines the model of the A/D conversion circuit 10. Alternatively, the conversion circuit model determination unit 22 may receive the information on the identifier from the A/D conversion circuit 10, through communication. The identifier differs in accordance with the difference of the amplification factor of the amplifier 11. In Embodiment 1, based on the received information on the identifier, the conversion circuit model determination unit 22 determines whether the A/D conversion circuit 10 is Model A in which the temperature-measurement range of the temperature measurement apparatus 1 is from 0° C. to 1300° C. or Model B in which the temperature-measurement range of the temperature measurement apparatus 1 is from 0° C. to 400° C.

<Thermoelectromotive Force Conversion Unit 23>

Based on the A/D conversion value Vin of the amplification voltage of the thermoelectromotive force of the thermocouple 5, the thermoelectromotive force conversion unit 23 inversely calculates the amplification factor Ramp of the amplifier 11 so as to calculate the thermoelectromotive force Vo of the thermocouple 5. In Embodiment 1, the thermoelectromotive force conversion unit 23 performs internal-reference-voltage compensation and cold-contact compensation. Specifically, the thermoelectromotive force conversion unit 23 calculates the thermoelectromotive force Vo of the thermocouple 5 by use of the equation (1).

$$Vo = \left\{(Vin - VRL) \times \frac{(VRH0 - VRL0)}{(VRH - VRL)} + VRL0\right\} \Big/ Ramp + Vc \quad (1)$$

Vin denotes the A/D conversion value [μV] of the amplification voltage of the thermoelectromotive force of the thermocouple 5, VRH denotes the A/D conversion value [μV] of the high-voltage-side internal reference voltage, VRL denotes the A/D conversion value [μV] of the low-voltage-side internal reference voltage, VRH0 denotes a preliminarily set specification value [μV] of the high-voltage-side internal reference voltage, and VRL0 denotes a preliminarily set specification value [μV] of the low-voltage-side internal reference voltage. Ramp denotes the amplification factor of the amplifier 11. With reference to amplification factor setting data in which the amplification factor Ramp of the amplifier 11 for each of the identifiers for the A/D conversion circuit 10 is stored, the thermoelectromotive force conversion unit 23 sets the amplification factor Ramp of the amplifier 11 corresponding to the actual identifier for the A/D conversion circuit 10 determined by the conversion circuit model determination unit 22. In the case where it is determined that the A/D conversion circuit 10 is Model A, the thermoelectromotive force conversion unit 23 sets the amplification factor Ramp to 240.4%; in the case where it is determined that the A/D conversion circuit 10 is Model B, the thermoelectromotive force conversion unit 23 sets the amplification factor Ramp to 764.7%.

Vc denotes a cold contact compensation voltage; the cold contact compensation voltage is the thermoelectromotive force of the thermocouple 5, corresponding to the temperature of the reference contact. Specifically, the thermoelectromotive force conversion unit 23 calculates the temperature Tc of the reference contact, which corresponds to the A/D conversion value Vb of the output voltage of the reference contact temperature sensor 13a, by use of a temperature-sensor characteristic in which the relationship between the output voltage of the reference contact temperature sensor 13a and the temperature thereof is preliminarily set. Then, by use of a polynomial, as expressed by the equation (2), whose variable is the temperature and that is to calculate the thermoelectromotive force of the thermocouple 5, the thermoelectromotive force conversion unit calculates the thermoelectromotive force Vc (cold contact compensation voltage) of the thermocouple 5, which corresponds to the temperature Tc of the reference contact, based on the temperature Tc of the reference contact. The thermocouple 5 is the K type.

$$Vc = c0 + c1 \cdot Tc + c2 \cdot Tc^2 + c3 \cdot Tc^3 + c4 \cdot Tc^4$$

1) $Tc \geq 0$ $c0 = -0.032742003, c1 = 39.46451363, c2 = 0.023466038$ $c3 = -5.38139 \times 10^{-5}, c4 = -3.25604 \times 10^{-7}$ 2) $Tc < 0$ $c0 = 0.04195804, c1 = 39.18045843, c2 = -0.11101399$ $c3 = -0.01961927, c4 = -0.00087413$ (2)

<Polynomial Temperature Calculation Unit 24>

Based on the actual thermoelectromotive force Vo of the thermocouple 5, which is calculated by the thermoelectromotive force conversion unit 23, the polynomial temperature calculation unit 24 calculates the temperature To by use of a temperature-calculation polynomial whose variable is the thermoelectromotive force of the thermocouple 5. For respective corresponding identifiers indicating the models of the A/D conversion circuit 10, the polynomial temperature calculation unit 24 stores respective polynomials whose powers and the coefficients of the powers are different from one another, and calculates the temperature To by use of the polynomial having the powers and the coefficients of the powers corresponding to the identifier for the A/D conversion circuit 10 that is actually provided. The polynomial temperature calculation unit 24 transmits the calculated temperature To to the external apparatus 94 through the communication circuit 92.

In Embodiment 1, there exists two models, i.e., Model A in which the temperature-measurement range of the temperature measurement apparatus 1 is from 0° C. to 1300° C. and Model B in which the temperature-measurement range of the temperature measurement apparatus 1 is from 0° C. to 400° C. The storage device 91 such a ROM stores the polynomial, for Model A, that is expressed by the equation (3) and has powers up to the 11th and the coefficients a0 through a11 for the 0th power through the 11th power and the polynomial, for Model B, that is expressed by the equation (4) and has powers up to the 10th and the coefficients b0 through b10 for the 0th power through the 10th power.

In the case where the conversion circuit model determination unit 22 determines that the A/D conversion circuit 10 is Model A, the polynomial temperature calculation unit 24 calculates the temperature To by use of the polynomial that is expressed by the equation (3) and has powers up to the 11th and the coefficients a0 through a11 for the 0th power through the 11th power.

1) In the case of Model A (0° C. to 1300° C.)

$$To = a0 + a1 \cdot V0 + a2 \cdot V0^2 + a3 \cdot V0^3 + a4 \cdot V0^4 + a5 \cdot V0^5 + a6 \cdot V0^6 + a7 \cdot V0^7 + a8 \cdot V0^8 + a9 \cdot V0^9 + a10 \cdot V0^{10} + a11 \cdot V0^{11}$$

$a0 = -2.389433 \times 10^{-1}, a1 = 2.649965 \times 10^{-2}, a2 = -1.355709 \times 10^{-6}$ $a3 = 3.458932 \times 10^{-10}, a4 = -4.461058 \times 10^{-14}, a5 = 3.375166 \times 10^{-18}$ $a6 = -1.621200 \times 10^{-22}, a7 = 5.101477 \times 10^{-27}, a8 = -1.049489 \times 10^{-31}$ $a9 = 1.360337 \times 10^{-36}, a10 = -1.008433 \times 10^{-41}, a11 = 3.260213 \times 10^{-47}$ (3)

In the case where the conversion circuit model determination unit 22 determines that the A/D conversion circuit 10 is Model B, the polynomial temperature calculation unit 24 calculates the temperature To by use of the polynomial that is expressed by the equation (4) and has powers up to the 10th and the coefficients b0 through b10 for the 0th power through the 10th power.

2) In the case of Model B (0° C. to 400° C.)

$$To = b0 + b1 \cdot V0 + b2 \cdot V0^2 + b3 \cdot V0^3 + b4 \cdot V0^4 + b5 \cdot V0^5 + b6 \cdot V0^6 + b7 \cdot V0^7 + b8 \cdot V0^8 + b9 \cdot V0^9 + b10 \cdot V0^{10}$$

$b0 = -9.558164 \times 10^{-3}, b1 = 2.545553 \times 10^{-2}, b2 = -6.310946 \times 10^{-7}$ $b3 = 2.546031 \times 10^{-10} b4 = -9.924323 \times 10^{-14}, b5 = 2.576823 \times 10^{-17}$ $b6 = -3.880239 \times 10^{-21}, b7 = 3.423084 \times 10^{-25}, b8 = -1.760175 \times 10^{-29}$ $b9 = 4.905597 \times 10^{-34}, b10 = -5.742622 \times 10^{-39}$ (4)

As described above, for respective identifiers for the A/D conversion circuit 10, the polynomial temperature calculation unit 24 stores corresponding polynomials whose powers and the coefficients of the powers are different from one another, and calculates the temperature To by use of the polynomial having the powers and the coefficients of the powers corresponding to the actual identifier; therefore, it is made possible to universalize the software for calculating the temperature by use of a polynomial, among two or more models having different temperature-measurement ranges. Accordingly, it is not required that the software for calculating a temperature by use of a polynomial is individually designed among two or more models having different temperature-measurement ranges; thus, the costs of designing and production can be suppressed.

In Embodiment 1 explained hereto, as an example, there has been explained the case where there exist two models, i.e., Model A in which the temperature-measurement range is from 0° C. to 1300° C. and the amplification factor is 240.4% and Model B in which the temperature-measurement range is from 0° C. to 400° C. and the amplification factor is 764.7%; however, the temperature-measurement range and the amplification factor may be different from those in Embodiment 1, and there may exist three or more models.

In the scope of the present disclosure, the embodiments thereof can freely be combined with one another and can appropriately be modified or omitted.

What is claimed is:

1. A temperature measurement apparatus comprising:

an A/D conversion circuit that is connected to one thermocouple, amplifies inputted thermoelectromotive force of the thermocouple with a fixed amplification factor which is preliminarily set corresponding to a preliminarily set fixed temperature-measurement range of the apparatus and then A/D-converts the thermoelectromotive force; and a temperature calculation circuit that calculates a temperature by use of a temperature-calculation polynomial whose variable is thermoelectromotive force of the thermocouple, based on actual thermoelectromotive force, of the thermocouple, that is A/D-converted by the A/D conversion circuit, wherein for respective identifiers indicating models of the A/D conversion circuit, wherein each model of the A/D conversion circuit is associated with different measurement temperature ranges, the temperature calculation circuit stores corresponding polynomials whose powers and the coefficients of the powers are different from one another; and calculates the temperature by use of the polynomial having the powers and the coefficients of the powers corresponding to the identifier for the A/D conversion circuit that is actually provided, wherein the temperature calculation circuit corresponds to the thermocouple of a predetermined specific model whose metal of the thermocouple is one and the same, and wherein the identifier differs in accordance with the difference of the amplification factor for the thermoelectromotive force of the thermocouple.

2. The temperature measurement apparatus according to claim 1, wherein the thermocouple of the predetermined specific model is K type.

* * * * *